(12) United States Patent
Noumura

(10) Patent No.: US 11,821,536 B2
(45) Date of Patent: Nov. 21, 2023

(54) VALVE DEVICE

(71) Applicant: DENSO CORPORATION, Kariya (JP)

(72) Inventor: Ryo Noumura, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/736,294

(22) Filed: May 4, 2022

(65) Prior Publication Data

US 2022/0260172 A1  Aug. 18, 2022

Related U.S. Application Data

(63) Continuation of application No. PCT/JP2020/038310, filed on Oct. 9, 2020.

(30) Foreign Application Priority Data

Nov. 7, 2019  (JP) .................................. 2019-202526

(51) Int. Cl.
*F16K 31/04*  (2006.01)

(52) U.S. Cl.
CPC .................................. *F16K 31/043* (2013.01)

(58) Field of Classification Search
CPC .. F16K 11/0873; F16K 31/535; F16K 31/043; F16H 57/0435
See application file for complete search history.

(56) References Cited

U.S. PATENT DOCUMENTS

| | | | |
|---|---|---|---|
| 7,819,383 B2* | 10/2010 | Morris | F16K 31/043 251/192 |
| 7,954,513 B2* | 6/2011 | Engelbrecht | F16K 11/0873 137/864 |
| 10,240,682 B2* | 3/2019 | Lou | F01P 7/14 |
| 10,746,282 B2* | 8/2020 | Ito | F16H 57/0471 |
| 10,975,975 B2* | 4/2021 | Sato | F16K 11/076 |
| 11,118,694 B2* | 9/2021 | Turnau | F16K 11/0876 |
| 2008/0053808 A1* | 3/2008 | Peffley | F16K 31/535 200/400 |
| 2020/0109787 A1* | 4/2020 | Tsuji | F16K 27/067 |
| 2020/0114725 A1 | 4/2020 | Kanzaki | |
| 2020/0300375 A1 | 9/2020 | Ikemoto et al. | |

(Continued)

FOREIGN PATENT DOCUMENTS

| | | |
|---|---|---|
| JP | S57-196850 | 12/1982 |
| JP | 2015-218763 | 12/2015 |

(Continued)

*Primary Examiner* — Umashankar Venkatesan
(74) *Attorney, Agent, or Firm* — Nixon & Vanderhye P.C.

(57) ABSTRACT

A shaft end section of a shaft is inserted into a receiving hole of a shaft receiver of a gear arrangement. An outer periphery, which forms an outer periphery of the shaft end section, has an end section flat surface portion and an end section curved surface portion. A receiving hole inner periphery, which forms an inner periphery of the receiving hole, has a receiving hole flat surface portion and a receiving hole curved surface portion. The shaft end section is press-fitted such that the receiving hole flat surface portion contacts at least a part of the end section flat surface portion, and the receiving hole curved surface portion contacts at least a part of the end section curved surface portion, while a central axis of the shaft end section overlaps with a central axis of the receiving hole.

4 Claims, 8 Drawing Sheets

(56) References Cited

U.S. PATENT DOCUMENTS

| | | | |
|---|---|---|---|
| 2021/0140360 A1 | 5/2021 | Kanzaki | |
| 2021/0140554 A1 | 5/2021 | Kanzaki | |
| 2022/0290766 A1* | 9/2022 | Brandt | F16K 31/535 |

FOREIGN PATENT DOCUMENTS

| | | |
|---|---|---|
| JP | 2017-101784 | 6/2017 |
| JP | 2021-076159 | 5/2021 |
| JP | 2021-076161 | 5/2021 |

* cited by examiner

VALVE DEVICE

CROSS REFERENCE TO RELATED APPLICATIONS

This application is a continuation application of International Patent Application No. PCT/JP2020/038310 filed on Oct. 9, 2020, which designated the U.S. and claims the benefit of priority from Japanese Patent Application No. 2019-202526 filed on Nov. 7, 2019. The entire disclosures of all of the above applications are incorporated herein by reference.

TECHNICAL FIELD

The present disclosure relates to a valve device.

BACKGROUND

Previously, there is a valve device that is configured to control a flow rate of a coolant (a fluid) for a motor vehicle. This valve device includes: a flow passage that is configured to conduct the fluid; a valve element that is configured to open and close the flow passage; a rotatable shaft (also simply referred to as a shaft) that is coupled to the valve element; an electric motor that is configured to output a drive force for driving the valve element; and a speed reducer that is configured to transmit the drive force of the electric motor to the valve element.

In the valve device described above, an output shaft of the electric motor is connected to the rotatable shaft of the valve element, through a driven gear of the speed reducer (hereinafter also referred to as a gear of a gear arrangement). The valve device is configured to control the flow rate of the fluid which flows in the flow passage. The gear is fixed to the rotatable shaft at a predetermined rotational angle such that the rotational angle of the valve element is defined based on the rotational angle of the gear.

SUMMARY

This section provides a general summary of the disclosure, and is not a comprehensive disclosure of its full scope or all of its features.

According to the present disclosure, there is provided a valve device including: a flow passage that is configured to conduct a fluid; a valve element that is configured to control a flow rate of the fluid that is outputted from the flow passage; a shaft that is made of metal and is coupled to the valve element; an electric motor that is configured to output a drive force for rotating the valve element through the shaft; and a gear unit that is configured to transmit an output of the electric motor to the shaft. The gear unit includes a shaft receiver that is made of resin and forms a receiving hole. A shaft end section of the shaft, which is located at one axial side of the shaft, is press-fitted into the receiving hole.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
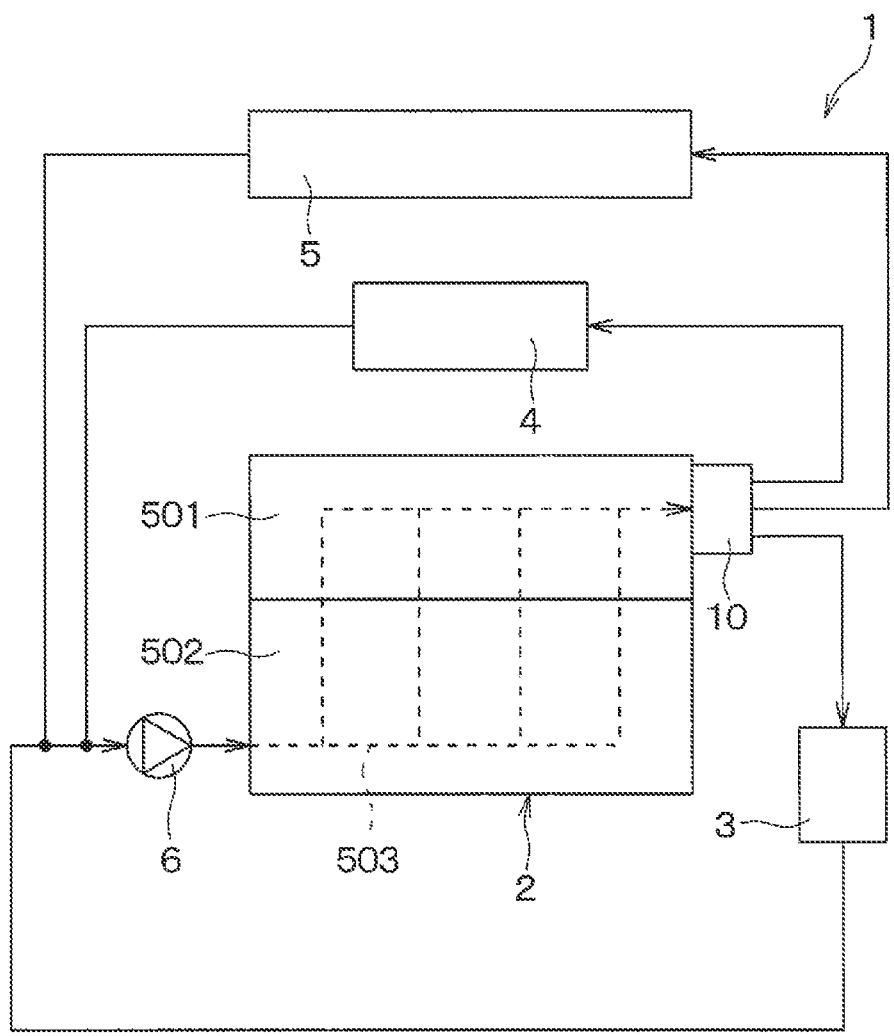
FIG. 1 is a schematic diagram of a cooling system in which a valve device of a first embodiment is applied.

Previously, there is a valve device that is configured to control a flow rate of a coolant (a fluid) for a motor vehicle. This valve device includes: a flow passage that is configured to conduct the fluid; a valve element that is configured to open and close the flow passage; a rotatable shaft (also simply referred to as a shaft) that is coupled to the valve element; an electric motor that is configured to output a drive force for driving the valve element; and a speed reducer that is configured to transmit the drive force of the electric motor to the valve element.

In the valve device described above, an output shaft of the electric motor is connected to the rotatable shaft of the valve element, through a driven gear of the speed reducer (hereinafter also referred to as a gear of a gear arrangement). The valve device is configured to control the flow rate of the fluid which flows in the flow passage. The gear is fixed to the rotatable shaft at a predetermined rotational angle such that the rotational angle of the valve element is defined based on the rotational angle of the gear.

However, when the gear is fixed to the rotatable shaft by a nut in the state where the gear is installed to the rotatable shaft at the predetermined rotational angle, a frictional force is generated in a rotational direction of the gear at a contact portion between the gear and the nut. As a result of detailed examination by the inventor of the present application, the inventor has found that the gear may be deviated from the predetermined rotational angle and is fixed due to the frictional force.

According to one aspect of the present disclosure, there is provided a valve device including:
  a flow passage that is configured to conduct a fluid;
  a valve element that is configured to control a flow rate of the fluid that is outputted from the flow passage;
  a shaft that is made of metal and is coupled to the valve element;
  an electric motor that is configured to output a drive force for rotating the valve element through the shaft; and
  a gear unit that is configured to transmit an output of the electric motor to the shaft, wherein:
  the gear unit includes a shaft receiver that is made of resin and forms a receiving hole, wherein a shaft end section of the shaft, which is located at one axial side of the shaft, is inserted into the receiving hole;
  an end section outer periphery, which forms an outer periphery of the shaft end section, has:
    an end section flat surface portion, which extends linearly in a radial cross-section of the shaft end section; and
    an end section curved surface portion, which forms an arc centered at a central axis of the shaft end section in the radial cross-section of the shaft end section;

a receiving hole inner periphery, which forms an inner periphery of the receiving hole, has:
  a receiving hole flat surface portion, which extends linearly in a radial cross-section of the receiving hole; and
  a receiving hole curved surface portion, which forms an arc centered at a central axis of the receiving hole in the radial cross-section of the receiving hole; and
the shaft end section is press-fitted into the receiving hole such that the receiving hole flat surface portion contacts at least a part of the end section flat surface portion, and the receiving hole curved surface portion contacts at least a part of the end section curved surface portion, while the central axis of the shaft end section overlaps with the central axis of the receiving hole.

In the valve device with the above configuration, since the shaft is fixed to the gear arrangement by the press-fitting, it is possible to limit generation of a force in a rotational direction of the gear arrangement at the time of fixing the gear arrangement in comparison to a case where the gear arrangement is fixed by the nut. Thus, the valve device can limit a deviation of the rotation angle of the shaft relative to the rotational angle of the gear arrangement.

Furthermore, since the shaft receiver has the receiving hole flat surface portion that is configured to contact the end section flat surface portion, the shaft can be rotated by a force, which is exerted from the receiving hole flat surface portion to urge the end section flat surface portion, in addition to a frictional force generated at a contact part between the receiving hole inner periphery and the end section outer periphery. Thus, the shaft can be more easily rotated in response to the rotation of the gear arrangement in comparison to a case where the receiving hole inner periphery and the end section outer periphery are respectively formed only by a curved surface. Therefore, it is possible to limit the deviation of the rotational angle of the shaft relative to the rotational angle of the gear arrangement.

Furthermore, since the shaft receiver has the receiving hole curved surface portion which is formed at the insertion hole inner periphery and contacts the end section curved surface portion, it is possible to ensure a sufficient size of a contact area of a contact part, at which the receiving hole inner periphery and the end section outer periphery contact with each other, in comparison to a case where each of the receiving hole inner periphery and the end section outer periphery has only the flat surface portion(s). For this reason, the valve device can easily ensure the required force for holding the shaft when the shaft end section is press-fitted into the shaft receiver, so that the gear arrangement and the shaft can be easily rotated integrally. Thus, it is possible to limit the deviation of the rotational angle of the shaft relative to the rotational angle of the gear arrangement.

Hereinafter, embodiments of the present disclosure will be described with reference to the drawings. In the following embodiments, the same reference signs may be given to components that are the same as or equal to those described in the preceding embodiment(s), and the redundant description thereof may be omitted. Further, when only some of the components are described in the embodiment, the rest of the components described in the preceding embodiment may be applied to the rest of the components. The following embodiments may be partially combined with each other as long as such a combination is not particularly hindered, even if such a combination is not explicitly described.

First Embodiment

A first embodiment will be described with reference to FIGS. 1 to 5. A valve device 10 is applied to, for example, a cooling system 1 that circulates a coolant for cooling an internal combustion engine (hereinafter referred to as an engine) 2 of a vehicle, and the valve device 10 controls a flow rate of the coolant that is circulated in the cooling system 1. Hereinafter, an example, in which the valve device 10 is applied to the cooling system 1, will be described.

As shown in FIG. 1, the cooling system 1 includes the valve device 10, the engine 2, an air conditioning heat exchanger 3, an oil cooler 4, a radiator 5 and a water pump 6.

The engine 2 includes: a cylinder head 501, which receives spark plugs; a cylinder block 502, which receives cylinders; and a water jacket 503 which forms a passage for the coolant. The coolant, which flows through the water jacket 503, is heated by the heat generated by driving the cylinders. The valve device 10 is connected to an outlet of the water jacket 503.

The valve device 10 is installed to the cylinder head 501, which has the outlet of the water jacket 503, and the coolant, which is heated at the time of passing through the water jacket 503, flows into the valve device 10. The valve device 10 is configured to output a required flow rate of the coolant to each of the air conditioning heat exchanger 3, the oil cooler 4 and the radiator 5.

The air conditioning heat exchanger 3 is configured to release heat from the coolant through heat exchange between the coolant, which is outputted from the valve device 10, and the air, which is to be blown into a cabin (hereinafter referred to as a vehicle cabin) of the vehicle. The water pump 6 is connected to a downstream side of the air conditioning heat exchanger 3 in a flow direction of the coolant, so that the coolant, which has passed through the air conditioning heat exchanger 3, flows into the water pump 6.

The oil cooler 4 is configured to cool oil through heat exchange between the coolant, which is outputted from the valve device 10, and the oil. The water pump 6 is connected to a downstream side of the oil cooler 4, so that the coolant, which has passed through the oil cooler 4, flows into the water pump 6.

The radiator 5 is configured to release heat from the coolant through heat exchange between the coolant, which is outputted from the valve device 10, and outside air. The water pump 6 is connected to a downstream side of the radiator 5, and the coolant, which has passed through the radiator 5, flows into the water pump 6.

The air conditioning heat exchanger 3, the oil cooler 4 and the radiator 5 are connected to an upstream side of the water pump 6, and an inlet of the water jacket 503 is connected to a downstream side of the water pump 6. The water pump 6 pressurizes the coolant received from the air conditioning heat exchanger 3, the oil cooler 4 and the radiator 5 and thereafter discharges the pressurized coolant to the water jacket 503.

As described above, in the cooling system 1, the water pump 6 is configured to circulate the coolant, and the valve device 10 is configured to output the required flow rate of the coolant to each of the air conditioning heat exchanger 3, the oil cooler 4 and the radiator 5.

Figure 2:
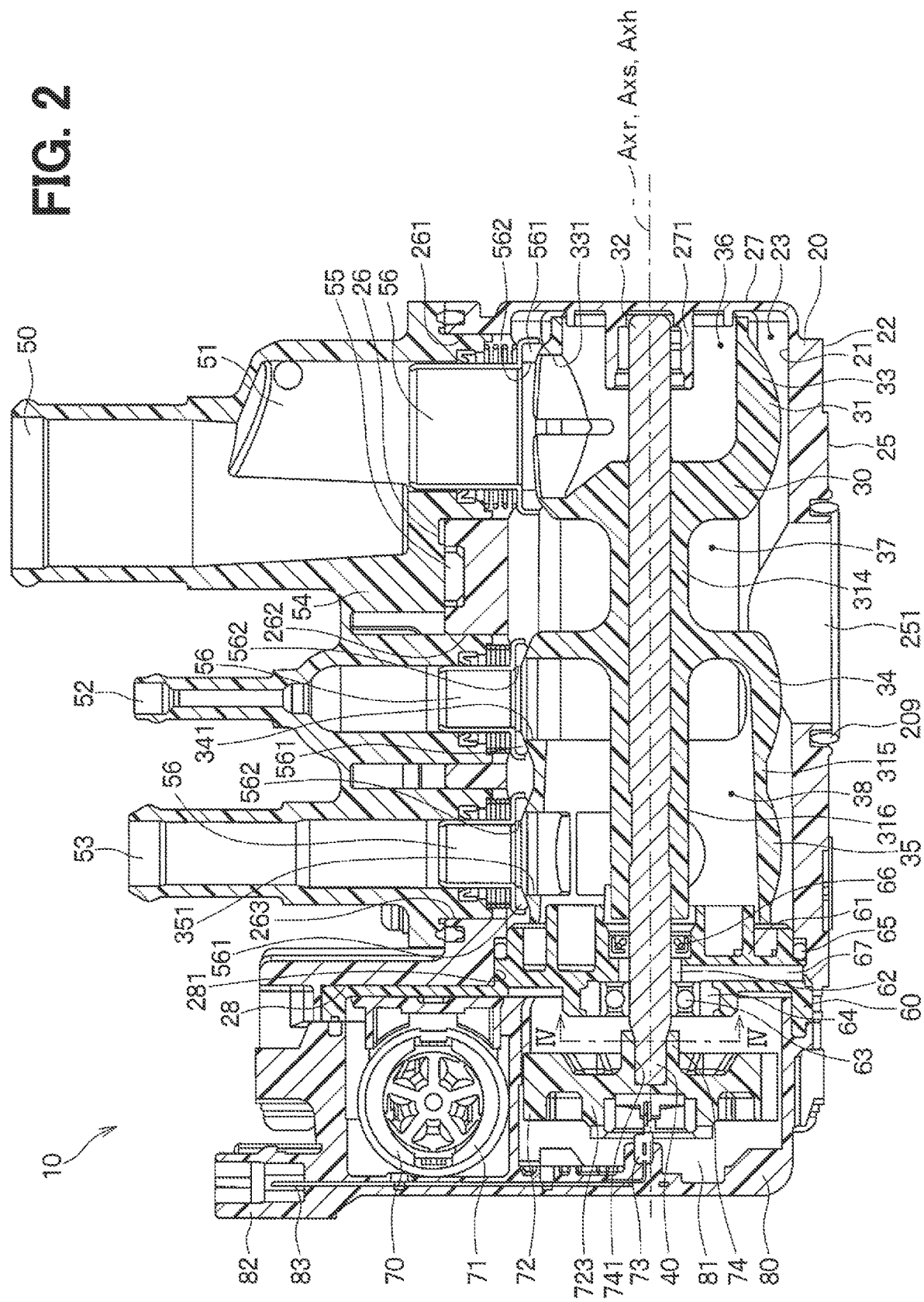
FIG. 2 is a schematic diagram indicating a structure of the valve device of the first embodiment.

Next, the valve device 10 will be described. As shown in FIG. 2, the valve device 10 includes a housing 20, a pipe member 50, a partition wall 60, a valve 30, a drive unit 70 and a drive unit cover 80.

The housing 20 is a receiving portion which receives the valve 30. The housing 20 is made of, for example, a resin member and is shaped in a bottomed tubular form. The housing 20 has: a housing inner wall 21, which forms an inside space 23; and a housing outer wall 22, which forms an outer shell of the housing 20.

The housing inner wall 21 is shaped in a cylindrical tubular form such that the inside space 23, which is shaped in a cylindrical form, is formed at the inside of the housing inner wall 21, and the valve 30 is received in the inside space 23.

The housing outer wall 22 has: an engine attachment surface 25, to which the engine 2 is attached; a pipe attachment surface 26, to which the pipe member 50 is attached; a housing bottom surface 27, which forms a bottom side surface; and a housing opening surface 28, to which the partition wall 60 is attached. The engine attachment surface 25 and the pipe attachment surface 26 are located at two opposed locations, respectively, which are opposed to each other, while the engine attachment surface 25 and the pipe attachment surface 26 are generally parallel to each other. Furthermore, the housing bottom surface 27 and the housing opening surface 28 are located at two opposed locations, respectively, which are opposed to each other, while the housing bottom surface 27 and the housing opening surface 28 are generally parallel to each other.

The engine attachment surface 25 is generally shaped in a flat surface form, and the engine 2 is attachable to the engine attachment surface 25. Furthermore, an inlet port 251, through which the coolant flows into the inside space 23, is formed at the engine attachment surface 25. The inlet port 251 opens in a circular form, and the water jacket 503 is connected to the inlet port 251.

The pipe attachment surface 26 is generally shaped in a flat surface form, and the pipe member 50 described later is attached to the pipe attachment surface 26. The pipe attachment surface 26 has a first outlet port 261, a second outlet port 262 and a third outlet port 263 that are configured to output the coolant, which is supplied to the inside space 23 through the inlet port 251, to the pipe member 50. The first outlet port 261, the second outlet port 262 and the third outlet port 263 respectively opens in a circular form.

The housing bottom surface 27 is generally shaped in a flat surface form and is continuous with the engine attachment surface 25 and the pipe attachment surface 26. A shaft support portion 271, which rotatably supports a shaft 32 described later, is formed at a portion of the housing inner wall 21 which is located on an inner side of the housing bottom surface 27.

The housing opening surface 28 is generally shaped in a flat surface form, and the partition wall 60 described later is attached to the housing opening surface 28. A housing opening 281, which communicates between the inside space 23 and the outside of the housing 20, is formed at the housing opening surface 28. The partition wall 60 is installed to the housing opening surface 28 to close the housing opening 281.

The pipe member 50 is made of, for example, a resin member and is configured to discharge the coolant, which is supplied to the inside space 23, to the air conditioning heat exchanger 3, the oil cooler 4 and the radiator 5. The pipe member 50 includes a first pipe portion 51, a second pipe portion 52 and a third pipe portion 53 which are respectively shaped in a cylindrical tubular form, and the first pipe portion 51, the second pipe portion 52 and the third pipe portion 53 are joined together by a pipe connecting portion 54.

The first pipe portion 51, the second pipe portion 52 and the third pipe portion 53 are joined to the pipe connecting portion 54, and the pipe connecting portion 54 is configured to attach the pipe member 50 to the pipe attachment surface 26. The pipe connecting portion 54 is configured to be in contact with and fixed to the pipe attachment surface 26. A gasket 55, which limits leakage of the coolant to the outside of the valve device 10, is installed between the pipe connecting portion 54 and the pipe attachment surface 26.

An upstream side part of the first pipe portion 51, which is located on the upstream side in the flow direction of the coolant, is placed at an inside of the first outlet port 261, and a downstream side part of the first pipe portion 51, which is located on the downstream side in the flow direction of the coolant, is connected to the radiator 5 through a hose (not shown). An upstream side part of the second pipe portion 52, which is located on the upstream side in the flow direction of the coolant, is placed at an inside of the second outlet port 262, and a downstream side part of the second pipe portion 52, which is located on the downstream side in the flow direction of the coolant, is connected to the air conditioning heat exchanger 3 through a hose (not shown). An upstream side part of the third pipe portion 53, which is located on the upstream side in the flow direction of the coolant, is placed at an inside of the third outlet port 263, and a downstream side part of the third pipe portion 53, which is located on the downstream side in the flow direction of the coolant, is connected to the oil cooler 4 through a hose (not shown). Three seal units 56 are respectively installed at a connection between the first pipe portion 51 and the first outlet port 261, a connection between the second pipe portion 52 and the second outlet port 262 and a connection between the third pipe portion 53 and the third outlet port 263.

These three seal units 56 are configured to limit leakage of the coolant from a gap between the first pipe portion 51 and the first outlet port 261, a gap between the second pipe portion 52 and the second outlet port 262 and a gap between the third pipe portion 53 and the third outlet port 263. A valve seal 561, which limits the leakage of the coolant, is installed at an upstream side part of each of the seal units 56 which is located on the upstream side in the flow direction of the coolant.

Each of the valve seals 561 is generally shaped in a circular ring form and is made of, for example, a resin member, and the coolant can flow into a seal opening 562 which is formed at an inside of the valve seal 561. The valve seal 561 is arranged such that an upstream side surface of the valve seal 561, which is located on the upstream side in the flow direction of the coolant, contacts an outer peripheral wall of the valve element 31 described later.

The partition wall 60 is configured to close the housing opening 281 and hold the valve 30 described later. The partition wall 60 is in contact with and is fixed to the housing opening surface 28. The partition wall 60 is shaped in a plate form and is made of, for example, a resin member. The partition wall 60 is arranged to cover the housing opening 281. Furthermore, the partition wall 60 has an opening closing portion 61 which projects toward an inside of the housing opening 281.

A shaft receiving hole 62, through which the shaft 32 of the valve 30 described later is inserted, is formed through the partition wall 60 and the opening closing portion 61. The shaft receiving hole 62 is configured to enable insertion of the shaft 32 therethrough. A bearing 63, which rotatably holds the shaft 32 inserted through the shaft receiving hole 62, is installed to the partition wall 60.

The opening closing portion 61 is configured to close the housing opening 281 and is placed at an inside of the housing opening 281. The opening closing portion 61 is generally shaped in a circular plate form such that a plate thickness direction of the opening closing portion 61 coincides with an axial direction of a central axis of the housing inner wall 21. The opening closing portion 61 is arranged such that an outer periphery of the opening closing portion 61 contacts an inner periphery of the housing opening 281.

Furthermore, a housing seal member 65, which is generally shaped in a circular ring form, is placed between the outer periphery of the opening closing portion 61 and the inner periphery of the housing opening 281. The housing seal member 65 is configured to close a gap between the outer periphery of the opening closing portion 61 and the inner periphery of the housing opening 281 and adjust a location of the shaft 32 inserted through the shaft receiving hole 62.

An outer diameter of the housing seal member 65 is smaller than an inner diameter of the housing opening 281 and is larger than an outer diameter of the opening closing portion 61. When the housing seal member 65 is placed between the housing opening 281 and the opening closing portion 61, the housing seal member 65 is compressed inward in a radial direction. Specifically, the housing seal member 65 is configured to place the shaft 32 generally at the center of the opening closing portion 61 when the shaft 32 is inserted through the shaft receiving hole 62 of the opening closing portion 61.

Furthermore, a shaft seal member 66 is placed at an inner periphery of the shaft receiving hole 62 of the opening closing portion 61. The shaft seal member 66 is configured to limit flow of the coolant from the inside space 23 into the shaft receiving hole 62. The shaft seal member 66 is generally shaped in a circular ring form and is made of a resin member. An inner diameter of the shaft seal member 66 is smaller than an outer diameter of the shaft 32. In a state where the shaft seal member 66 is installed to the inner periphery of the shaft receiving hole 62, the shaft 32 is inserted through the shaft seal member 66.

The opening closing portion 61 has a partition wall penetrating hole 67, through which the coolant supplied to the shaft receiving hole 62 is outputted to the outside. The partition wall penetrating hole 67 extends from the shaft receiving hole 62 toward a radially outer side of the shaft receiving hole 62 and penetrates through the opening closing portion 61. The partition wall penetrating hole 67 is communicated with a housing penetrating hole (not shown) which extends through the housing 20.

The shaft receiving hole 62 is configured such that an axial direction of a central axis of the shaft receiving hole 62 coincides with the axial direction of the central axis of the housing inner wall 21, and the central axis of the shaft receiving hole 62 and a central axis of the bearing 63 become coaxial with a central axis of the shaft 32 when the shaft 32 is inserted into the shaft receiving hole 62. Hereinafter, the central axis of the shaft 32 will be also referred to as a rotational axis Axr.

The bearing 63 is, for example, a ball bearing and is configured to rotatably support the shaft 32 inserted through the shaft receiving hole 62. Furthermore, a metal ring 64, to which the bearing 63 is installed, is placed at an outer periphery of the bearing 63. The metal ring 64 is generally shaped in a circular ring form and is made of, for example, a metal member. The metal ring 64 is configured such that the bearing 63 can be press-fitted to an inside of the metal ring 64.

The drive unit cover 80, which will be described later, is installed to an opposite surface of the partition wall 60 which is opposite to a surface of the partition wall 60 to which the housing opening surface 28 contacts.

Next, the valve 30 will be described. The valve 30 is a so-called ball valve and includes: the valve element 31 which is made of resin and is configured to control a flow rate of the fluid outputted from the valve 30; and the shaft 32 which is made of metal and is configured to rotate the valve element 31. The valve element 31 is coupled to, for example, the shaft 32 and is configured to rotate integrally with the shaft 32 about the rotational axis Axr.

The shaft 32 is a rotatable shaft for rotating the valve element 31 and is shaped in a cylindrical form having a radial cross-section shaped in a circular form. One end section of the shaft 32, which is located at one axial side of the shaft 32, is coupled to a gear arrangement 72 described later, and an opposite end section of the shaft 32, which is opposite to the one end section of the shaft 32, is connected to the shaft support portion 271.

The valve element 31 extends along the rotational axis Axr of the shaft 32 and has a first ball valve 33, a second ball valve 34, a third ball valve 35, a tubular connecting portion 314, a tubular valve connecting portion 315 and a shaft connecting portion 316. Furthermore, in the valve element 31, the first ball valve 33 and the second ball valve 34 are connected with each other through the tubular connecting portion 314 which is shaped in a tubular form, and the second ball valve 34 and the third ball valve 35 are connected with each other through the tubular valve connecting portion 315 which is shaped in a tubular form.

Furthermore, in the valve element 31, the shaft connecting portion 316 is placed at a radial center of the first to third ball valves 33-35, and the valve element 31 is connected to the shaft 32 through the shaft connecting portion 316. In the valve element 31, for example, the first ball valve 33, the second ball valve 34, the third ball valve 35, the tubular connecting portion 314, the tubular valve connecting portion 315 and the shaft connecting portion 316 are formed integrally in one-piece by injection molding.

The first to third ball valves 33-35 are respectively shaped in a tubular form and are arranged along the shaft 32 such that a central axis of each of the first to third ball valves 33-35 is coaxial with the rotational axis Axr. Furthermore, an axial center portion of each of the first to third ball valves 33-35, which is centered in the axial direction of the rotational axis Axr, is radially outwardly bulged in comparison to two opposite sides of each of the first to third ball valves 33-35, which are opposite to each other in the axial direction of the rotational axis Axr. Furthermore, each of the first to third ball valves 33-35 opens at the two opposite sides of each of the first to third ball valves 33-35, which are opposite to each other in the axial direction of the rotational axis Axr, and a flow passage 36, which conducts the coolant, is formed at an inside of the first to third ball valves 33-35.

A first intervening space 37 is formed between an outer peripheral wall of the tubular connecting portion 314 and the housing inner wall 21 at a location between the first ball valve 33 and the second ball valve 34. Specifically, a portion of the flow passage 36, which is formed at an inside of the first ball valve 33, and another portion of the flow passage 36, which is formed at an inside of the second ball valve 34, are communicated with each other through the first intervening space 37.

An outer peripheral wall of the second ball valve 34 and an outer peripheral wall of the third ball valve 35 are connected with each other through an outer peripheral wall of the tubular valve connecting portion 315, and an inner peripheral wall of the second ball valve 34 and an inner peripheral wall of the third ball valve 35 are connected with each other through an inner peripheral wall of the tubular valve connecting portion 315. Specifically, a portion of the flow passage 36, which is formed at an inside of the second ball valve 34, and another portion of the flow passage 36, which is formed at an inside of the third ball valve 35, are communicated with each other through a second intervening space 38 which is formed at an inside of the tubular valve connecting portion 315.

Openings are respectively formed at the outer peripheries of the first to third ball valves 33-35 to communicate the flow passage 36, which is formed at the insides of the first to third ball valves 33-35, to the outside of the first to third ball valves 33-35. Specifically, in the valve element 31, a first valve element opening 331, a second valve element opening 341 and a third valve element opening 351 are respectively formed at the outer periphery of the first ball valve 33, the outer periphery of the second ball valve 34 and the outer periphery of the third ball valve 35.

The first ball valve 33 is arranged at a position where the first valve element opening 331 is enabled to communicate with the first outlet port 261 and is also enabled to communicate with the seal opening 562 of the valve seal 561 placed at the first outlet port 261. The second ball valve 34 is arranged at a position where the second valve element opening 341 is enabled to communicate with the second outlet port 262 and is also enabled to communicate with the seal opening 562 of the valve seal 561 placed at the second outlet port 262. The third ball valve 35 is arranged at a position where the third valve element opening 351 is enabled to communicate with the third outlet port 263 and is also enabled to communicate with the seal opening 562 of the valve seal 561 placed at the third outlet port 263. Furthermore, the tubular connecting portion 314 is arranged at a position where the tubular connecting portion 314 is opposed to the inlet port 251.

Specifically, the valve 30 is configured such that the coolant, which is outputted from the engine 2, flows into the inside space 23 through the inlet port 251 and also flows into the flow passage 36 formed at the insides of the first to third ball valves 33-35 through the first intervening space 37. Furthermore, in the valve 30, each of the first to third valve element openings 331-351 is configured such that the coolant is outputted from the corresponding one of the seal openings 562 of the valve seals 561, which are installed at the first to third outlet ports 261-263, in response to rotation of the valve element 31.

Furthermore, the valve 30 is configured to control the flow rate of the coolant outputted from the valve element 31 according to a size of an overlapping area between each of the first to third valve element openings 331-351 and a corresponding one of the seal openings 562. Specifically, the flow rate of the coolant, which flows from the first valve element opening 331 to the radiator 5, the flow rate of the coolant, which flows from the second valve element opening 341 to the air conditioning heat exchanger 3, and the flow rate of the coolant, which flows from the third valve element opening 351 to the oil cooler 4, are controlled by a rotational angle of the valve element 31.

Next, the drive unit cover 80 will be described. The drive unit cover 80 is configured to receive the drive unit 70 and is installed to the opposite surface of the partition wall 60 which is opposite to the surface of the partition wall 60 to which the housing opening surface 28 contacts. The drive unit cover 80 is shaped in a hollow form and is made of a resin member. A drive unit space 81, which receives the drive unit 70, is formed at an inside of the drive unit cover 80.

Furthermore, the drive unit cover 80 has a connector 82 that is configured to be connected with an undepicted electronic control unit (ECU). The connector 82 is configured to connect the valve device 10 to the ECU, and a plurality of terminals 83, which are connected to the drive unit 70 and the rotational angle sensor 73, are inserted in the connector 82.

The drive unit 70 includes: the electric motor 71, which is configured to output a drive force for rotating the valve element 31 through the shaft 32; the gear arrangement 72, which is configured to transmit the output of the electric motor 71 to the shaft 32; and a rotational angle sensor 73, which is configured to sense a rotational angle of the gear arrangement 72.

Figure 3:
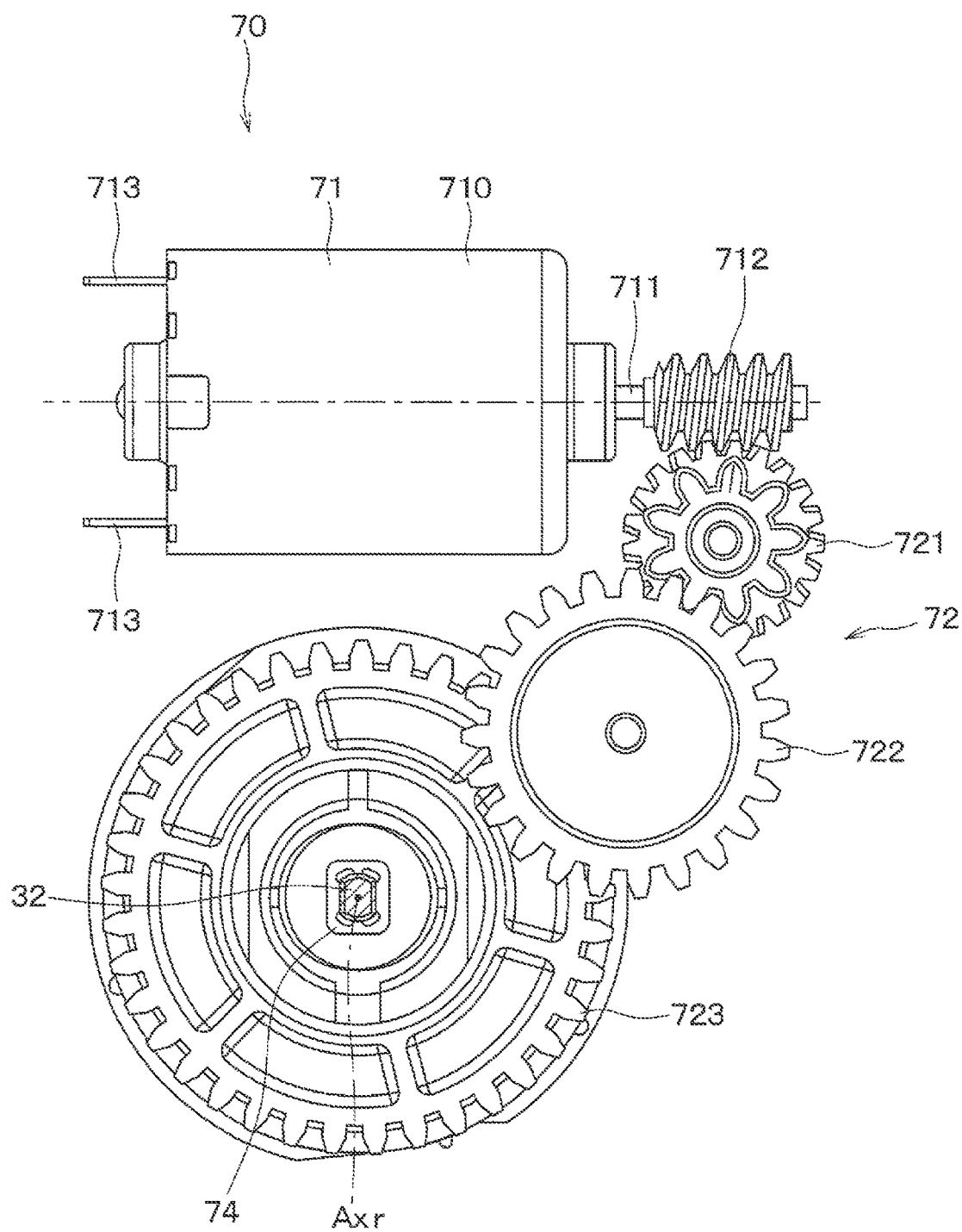
FIG. 3 is a schematic diagram indicating a structure of a drive unit of the first embodiment.

As shown in FIG. 3, the electric motor 71 includes a motor main body 710, a motor shaft 711, a worm gear 712 and a plurality of motor-side terminals 713. The motor main body 710 is configured to output the drive force when the electric power is supplied to the motor-side terminals 713. The motor main body 710 is generally shaped in a cylindrical tubular form, and the motor shaft 711 projects from one end portion of the motor main body 710. The drive force, which is outputted from the motor main body 710, is inputted to the gear arrangement 72 through the motor shaft 711 and the worm gear 712.

The gear arrangement 72 includes a speed reducing mechanism that has a plurality of gears made of resin. The gear arrangement 72 is configured to transmit the drive force, which is outputted from the worm gear 712, to the shaft 32. Specifically, the gear arrangement 72 includes: a first gear 721; a second gear 722 meshed with the first gear 721; and a third gear 723 meshed with the second gear 722. The shaft 32 is coupled to the third gear 723. In the gear arrangement 72, an outer diameter of the second gear 722 is larger than an outer diameter of the first gear 721, and an outer diameter of the third gear 723 is larger than the outer diameter of the second gear 722.

Furthermore, central axes of the first to third gears 721-723 are perpendicular to a central axis of the worm gear 712. The third gear 723 is arranged such that the central axis of the third gear 723 is coaxial with the rotational axis Axr. The third gear 723 has a shaft receiver 74 into which the shaft 32 is inserted.

A shaft end section 40, which is an end section of the shaft 32, is press-fitted into the shaft receiver 74 such that a rotational angle of the shaft 32 is determined based on a rotational angle of the third gear 723. Details of the shaft receiver 74 and the shaft end section 40 will be described later.

The drive unit 70 and the shaft 32 are configured such that the worm gear 712, the first to third gears 721-723 and the shaft 32 are rotated together. The rotations of the worm gear 712, the first to third gears 721-723 and the shaft 32 have a correlation with each other. Specifically, the rotational angles of the worm gear 712, the first to third gears 721-723 and the shaft 32 have a correlation with each other. The worm gear 712, the first to third gears 721-723 and the shaft 32 are configured as follows. That is, the rotational angle of one of the worm gear 712, the first to third gears 721-723 and the shaft 32 can be calculated based on the rotational angle of another one or more of the worm gear 712, the first to third gears 721-723 and the shaft 32 which have the correlation with each other.

In the present embodiment, the rotational angle sensor 73, which is configured to sense the rotational angle of the third gear 723, is installed to an inner periphery of the drive unit cover 80 at a location where the rotational angle sensor 73 is opposed to the third gear 723. The rotational angle sensor 73 is a Hall effect sensor, which includes a Hall element. The rotational angle sensor 73 is configured to sense the rotational angle of the third gear 723 in a non-contact manner. The rotational angle sensor 73 is connected to the ECU (not shown) through the connector 82 and is configured to transmit the sensed rotational angle of the third gear 723 to the ECU. The ECU is configured to calculate the rotational angle of the shaft 32 based on the rotational angle of the third gear 723 transmitted from the rotational angle sensor 73.

Besides the Hall effect sensor, another type of non-contact type angle sensor, such as a magnetoresistive (MR) sensor, an inductive sensor, or a contact type angle sensor, such as a potentiometer sensor, may be used to sense the rotational angle of the third gear 723. The rotational angle sensor 73 is configured to sense the rotational angle of one of the worm gear 712, the first gear 721 and the second gear 722.

Next, details of the shaft end section 40 and the shaft receiver 74 will be described with reference to FIG. 4. The shaft end section 40 forms the end section of the shaft 32, which is located at the one axial side of the shaft 32, and the shaft end section 40 is inserted into a receiving hole 741 of the shaft receiver 74. The central axis of the shaft end section 40 is coaxial with the rotational axis Axr.

The outer periphery of the shaft end section 40 includes: a pair of end section flat surface portions 411 (hereinafter also referred to as a pair of end section flat surface portions 411a, 411b), each of which extends linearly in a radial cross-section of the shaft end section 40; and a pair of end section curved surface portions 412 (hereinafter also referred to as a pair of end section curved surface portions 412a, 412b), each of which forms an arc centered at the central axis of the shaft end section 40 in the radial cross-section of the shaft end section 40. Hereinafter, the outer periphery of the shaft end section 40 will be also referred to as an end section outer periphery 41, and the central axis of the shaft end section 40 will be also referred to as an end section central axis Axs.

Figure 4:
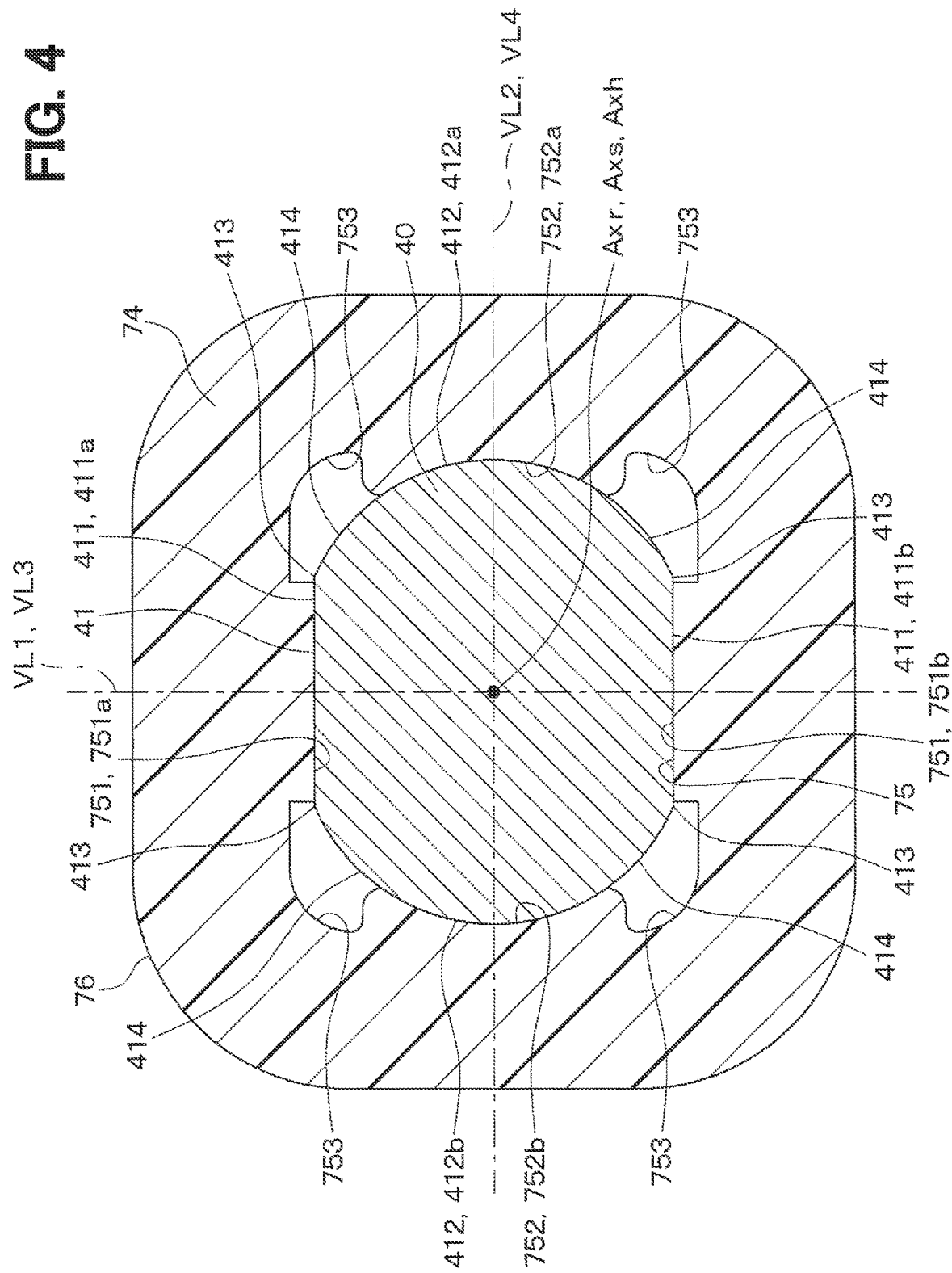
FIG. 4 is a cross-sectional view taken along line IV-IV in FIG. 2.

The straight line of each end section flat surface portion 411 at the radial cross-section of the shaft end section 40 shown I FIG. 4 continues in the axial direction of the end section central axis Axs. In other words, the end section flat surface portion 411 extends in the axial direction of the end section central axis Axs. Furthermore, the arc of each end section curved surface portion 412, which is centered at the end section central axis Axs in the radial cross-section of the shaft end section 40 shown in FIG. 4, continues in the axial direction of the end section central axis Axs. In other words, the end section curved surface portion 412 extends in the axial direction of the end section central axis Axs.

Specifically, as shown in FIG. 4, the end section outer periphery 41 of the shaft end section 40 includes the pair of end section flat surface portions 411a, 411b and the pair of end section curved surface portions 412a, 412b, which are alternately arranged in a circumferential direction about the end section central axis Axs. Furthermore, in the end section outer periphery 41, each connection between a corresponding one of the end section flat surface portions 411 and a corresponding one of the end section curved surface portions 412 forms an end section connecting portion 413. In the present embodiment, the end section connecting portion 413 is formed at four locations, at each of which the corresponding one of the end section flat surface portions 411a, 411b and the corresponding one of the end section curved surface portions 412a, 412b are connected with each other. Furthermore, in the present embodiment, the shaft end section 40 is formed such that the shape of the radial cross-section of the shaft end section 40 is point-symmetrical about the end section central axis Axs.

Here, in the radial cross-section of the shaft end section 40, an imaginary line, which extends through a center of each of the end section flat surface portions 411a, 411b, is defined as an imaginary line VL1, and another imaginary line, which extends through a center of each of the end section curved surface portions 412a, 412b, is defined as an imaginary line VL2. The end section flat surface portion 411a and the end section flat surface portion 411b are generally parallel to each other, and a length of the end section flat surface portion 411a, which is measured in an axial direction of the imaginary line VL2, and a length of the end section flat surface portion 411b, which is measured in the axial direction of the imaginary line VL2, are generally equal to each other.

Furthermore, the end section outer periphery 41 is formed such that a length of the arc of the end section curved surface portion 412a and a length of the arc of the end section curved surface portion 412b are generally equal to each other. Specifically, the end section outer periphery 41 is formed such that a length of the end section curved surface portion 412a, which is measured in an axial direction of the imaginary line VL1, and a length of the end section curved surface portion 412b, which is measured in the axial direction of the imaginary line VL1, are generally equal to each other. Also, the end section outer periphery 41 is formed such that the imaginary line VL1 and the imaginary line VL2 are generally perpendicular to each other.

Furthermore, the shaft end section 40 is formed such that a maximum length of a straight line, which connects between two different points of the outer periphery of the radial cross-section of the shaft end section 40, is smaller than an inner diameter of the shaft seal member 66. In other words, a length of a straight line, which connects between two most distant points at the outer periphery of the radial cross-section of the shaft end section 40, is smaller than the inner diameter of the shaft seal member 66. Hereinafter, the maximum length of the straight line, which connects between the two different points of the outer periphery of the radial cross-section of the shaft end section 40, is also referred to as a maximum outer diameter of the shaft end section 40.

In the present embodiment, the shaft end section 40 is configured such that the pair of end section curved surface portions 412 and the pair of end section flat surface portions 411 are alternately arranged in the circumferential direction in the radial cross-section of the shaft end section 40 while each of the end section curved surface portions 412 forms the arc that is centered at the end section central axis Axs. Therefore, the maximum outer diameter of the shaft end section 40 is a diameter of the arc, which is centered at the end section central axis Axs. Specifically, the shaft end section 40 is formed such that the diameter of the arc, which is centered at the end section central axis Axs in the radial cross-section of the shaft end section 40, is smaller than the inner diameter of the shaft seal member 66.

Next, the shaft receiver 74 will be described. The shaft receiver 74 is made of a resin member and projects toward the partition wall 60 along the central axis of the third gear 723. The shaft receiver 74 has a receiving hole 741 which is shaped in a tubular form and receives the shaft end section 40. Hereinafter, an outer periphery of the receiving hole 741 will be referred to as a receiving hole outer periphery 76, and an inner periphery of the receiving hole 741 will be referred to as a receiving hole inner periphery 75. Furthermore, a central axis of the receiving hole 741 will be referred to as a receiving hole central axis Axh.

As indicated in FIG. 4, the shaft receiver 74 is generally shaped in a square tubular form, and the shaft end section 40 is press-fitted into an inside of the shaft receiver 74. Furthermore, in a radial cross-section of the receiving hole 741, the receiving hole outer periphery 76 is generally shaped in a square form having four sides while a corner between each adjacent two of the four sides is shaped in a curved surface form.

Furthermore, as shown in FIG. 4, the receiving hole inner periphery 75 has: a pair of receiving hole flat surface portions 751 (hereinafter, also referred to as a pair of receiving hole flat surface portions 751a, 751b), each of which extends linearly in the radial cross-section of the receiving hole 741; and a pair of receiving hole curved surface portions 752 (hereinafter, also referred to as a pair of receiving hole curved surface portions 752a, 752b), each of which forms an arc centered at the receiving hole central axis Axh in the radial cross-section of the receiving hole 741. A straight line of each receiving hole flat surface portion 751 in the radial cross-section of the receiving hole 741 shown in FIG. 4 continues in an axial direction of the receiving hole central axis Axh. In other words, the receiving hole flat surface portion 751 extends in the axial direction of the receiving hole central axis Axh. An arc of each receiving hole curved surface portion 752, which is centered at the receiving hole central axis Axh in the radial cross-section of the receiving hole 741 shown in FIG. 4, continues in the axial direction of the receiving hole central axis Axh. In other words, the receiving hole curved surface portion 752 extends in the axial direction of the receiving hole central axis Axh.

Specifically, the receiving hole inner periphery 75 has: the pair of receiving hole flat surface portions 751a, 751b, which are opposed to each other about the receiving hole central axis Axh; and the pair of receiving hole curved surface portions 752a, 752b, which are opposed to each other about the receiving hole central axis Axh.

Furthermore, the receiving hole inner periphery 75 is arranged such that when the shaft end section 40 is press-fitted into the shaft receiver 74, the receiving hole flat surface portion 751a is opposed to the end section flat surface portion 411a, and the receiving hole flat surface portion 751b is opposed to the end section flat surface portion 411b. Furthermore, the receiving hole inner periphery 75 is arranged such that when the shaft end section 40 is press-fitted into the shaft receiver 74, the receiving hole curved surface portion 752a is opposed to the end section curved surface portion 412a, and the receiving hole curved surface portion 752b is opposed to the end section curved surface portion 412b.

Also, the receiving hole inner periphery 75 is formed such that when the shaft end section 40 is press-fitted into the receiving hole 741, each receiving hole flat surface portion 751 contacts at least a part of the corresponding end section flat surface portion 411, and each receiving hole curved surface portion 752 contacts at least a part of the corresponding end section curved surface portion 412. In the present embodiment, the receiving hole inner periphery 75 and the shaft end section 40 are formed such that the receiving hole flat surface portions 751a, 751b respectively contact the opposed end section flat surface portions 411a, 411b, and the receiving hole curved surface portions 752a, 752b respectively contact the opposed end section curved surface portions 412a, 412b.

Here, in the radial cross-section taken in the radial direction of the receiving hole central axis Axh, an imaginary line, which extends through a center of each of the receiving hole flat surface portions 751a, 751b, is defined as an imaginary line VL3, and an imaginary line, which extends through a center of each of the receiving hole curved surface portions 752a, 752b, is defined as an imaginary line VL4. The receiving hole flat surface portion 751a and the receiving hole flat surface portion 751b are generally parallel to each other, and a length of the receiving hole flat surface portion 751a, which is measured in an axial direction of the imaginary line VL4, and a length of the receiving hole flat surface portion 751b, which is measured in the axial direction of the imaginary line VL4, are generally equal to each other.

Furthermore, the receiving hole inner periphery 75 is formed such that a length of the arc of the receiving hole curved surface portion 752a and a length of the arc of the receiving hole curved surface portion 752b are generally equal to each other. Specifically, the receiving hole inner periphery 75 is formed such that a length of the receiving hole curved surface portion 752a, which is measured in an axial direction of the imaginary line VL3, and a length of the receiving hole curved surface portion 752b, which is measured in the axial direction of the imaginary line VL3, are generally equal to each other.

The receiving hole central axis Axh is coaxial with the rotational axis Axr. Also, the receiving hole inner periphery 75 is formed such that the imaginary line VL3 and the imaginary line VL4 are generally perpendicular to each other, and the imaginary line VL3 overlaps with the imaginary line VL1, and the imaginary line VL4 overlaps with the imaginary line VL2.

Furthermore, in the receiving hole inner periphery 75, the receiving hole flat surface portions 751 and the receiving hole curved surface portions 752 are alternately arranged in the circumferential direction such that a corresponding one of the receiving hole flat surface portions 751 and a corresponding one of the receiving hole curved surface portion 752 are connected with each other through a portion of the receiving hole inner periphery 75 which is spaced from a corresponding adjacent one of the end section flat surface portions 411 and a corresponding adjacent one of the end section curved surface portions 412. Specifically, the receiving hole inner periphery 75 has four recesses 753, each of which is formed between a corresponding one of the receiving hole flat surface portions 751a, 751b and a corresponding one of the receiving hole curved surface portions 752a, 752b such that the recess 753 is recessed away from the receiving hole central axis Axh. That is, the recesses 753 are formed such that the recesses 753 do not come into contact with the end section flat surface portions 411a, 411b and the end section curved surface portions 412a, 412b.

In addition, in order to make the surface area where the receiving hole inner periphery 75 contacts the end section outer periphery 41 as large as possible at the time of press-fitting the shaft end section 40 into the receiving hole 741, it is preferred that the portions of the receiving hole inner periphery 75, which are spaced from the end section flat surface portions 411a, 411b, are formed as small as possible. Similarly, it is preferred that the portions of the receiving hole inner periphery 75, which are spaced from the end section curved surface portions 412a, 412b, are formed as small as possible.

In the present embodiment, each of the four recesses 753 is formed at the corresponding location at which the recess 753 is opposed to the corresponding one of the four end section connecting portions 413. In each of the recesses 753, one portion, which is spaced from the adjacent one of the end section flat surface portions 411a, 411b in the radial cross-section of the receiving hole 741, is shaped in a form of a straight line in conformity with the shape of the adjacent end flat surface portion, 411a, 411b. Also, in each of the recesses 753, the other portion, which is spaced from the adjacent one of the end section curved surface portions 412a, 412b in the radial cross-section of the receiving hole 741, is shaped in a form of an arc in conformity with the shape of the adjacent end section curved surface portion 412a, 412b.

Figure 5:
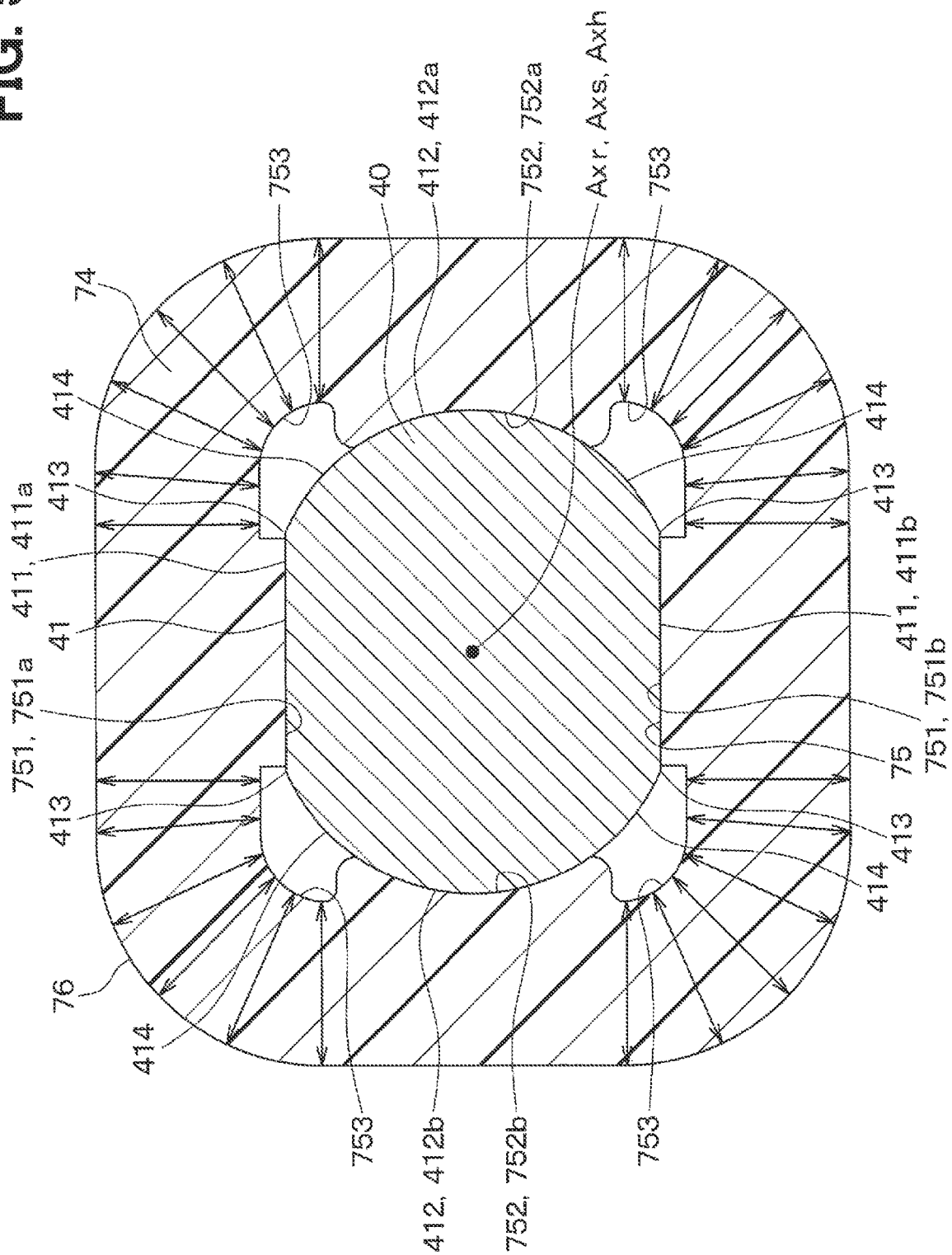
FIG. 5 is a diagram for describing a shaft receiver and a shaft end section of the first embodiment.

Here, each of the portions of the end section outer periphery 41, which do not contact the receiving hole inner periphery 75, is defined as an end section non-contact portion 414. As shown in FIG. 5, a wall thickness (see a double-sided arrow) of each of parts of the shaft receiver 74, which are respectively opposed to the end section non-contact portions 414, is constant. The wall thickness of the shaft receiver 74 refers to a distance between the receiving hole outer periphery 76 and the receiving hole inner periphery 75. Further, the constant wall thickness of the respective parts of the shaft receiver 74 means that the distance between the receiving hole outer periphery 76 and the receiving hole inner periphery 75 is substantially constant, and a slight difference due to a manufacturing error or the like is included in this constant wall thickness.

Next, the operation of the valve device 10 will be described. The ECU (not shown) calculates a required flow rate of the coolant for each of the air conditioning heat exchanger 3, the oil cooler 4 and the radiator 5 based on a driving state of the vehicle and calculates a rotational angle of the valve element 31, i.e., a rotational angle of the electric motor 71 which is required to output the required flow rate of the coolant. Then, the ECU transmits information of the calculated rotational angle of the electric motor 71 to the valve device 10.

The valve device 10 rotates the electric motor 71 based on the information of the rotational angle received from the ECU. Then, the valve device 10 rotates the valve element 31 through the gear arrangement 72 and the shaft 32 by rotating the electric motor 71 and thereby outputs the required flow rate of the coolant from the first to third valve element openings 331-351. Specifically, the valve device 10 outputs the required flow rate of the coolant, which is required for the radiator 5, from the first valve element opening 331 and outputs the required flow rate of the coolant, which is required for the air conditioning heat exchanger 3, from the second valve element opening 341. Also, the valve device 10 outputs the required flow rate of the coolant, which is required for the oil cooler 4, from the third valve element opening 351.

Furthermore, in the valve device 10, the rotational angle sensor 73 senses the rotational angle of the third gear 723 and outputs information of the sensed rotational angle to the ECU. The ECU calculates the rotation angle of the shaft 32 based on the information of the rotational angle of the third gear 723 received from the valve device 10. Then, the ECU determines whether the required flow rate of the coolant is supplied to each of the air conditioning heat exchanger 3, the oil cooler 4 and the radiator 5. Thereafter, in a case where the coolant, which is outputted to each of the air conditioning heat exchanger 3, the oil cooler 4 and the radiator 5 is excessive or insufficient, the ECU calculates a rotational angle of the electric motor 71, at which the flow rate is optimized, and then ECU transmits information of the calculated rotational angle to the valve device 10.

The valve device 10 receives the information of the rotational angle of the electric motor 71 from the ECU and adjusts the rotational angle of the electric motor 71 based on the received information of the rotational angle.

In the valve device 10 of the present embodiment described above, since the shaft 32 is fixed by the press-fitting to the third gear 723, which forms the part of the gear arrangement 72, a force, which is exerted at the time of fixing the shaft 32 to the third gear 723, is exerted in the axial direction of the rotational axis Axr. Therefore, in the case where the gear arrangement 72 (more specifically, the third gear 723 of the gear arrangement 72) is fixed to the shaft 32 at a predetermined rotational angle, it is possible to limit generation of a force in the rotational direction of the gear arrangement 72 at the time of fixing the gear arrangement 72 in comparison to a case where the gear arrangement 72 (more specifically, the third gear 723 of the gear arrangement 72) is fixed to the shaft 32 by the nut. Thus, the valve device 10 can limit a deviation of the rotation angle of the shaft 32 relative to the rotational angle of the gear arrangement 72.

By the way, when the shaft 32 is fixed to the third gear 723 with the nut, the shaft 32 may possibly be fixed in a state where the receiving hole central axis Axh deviates relative to the end section central axis Axs due to presence of a play of a screw thread. In contrast, in the valve device 10 of the present embodiment, since the shaft 32 is fixed to the third gear 723 by the press-fitting, it is possible to limit an occurrence of the deviation between the end section central axis Axs and the receiving hole central axis Axh caused by the presence of the paly of the screw thread.

Furthermore, the end section outer periphery 41 of the shaft end section 40 has: the end section flat surface portions 411, which are configured to contact the receiving hole flat surface portions 751, respectively; and the end section curved surface portions 412, which are configured to contact the receiving hole curved surface portions 752, respectively. Therefore, in the valve device 10, when the gear arrangement 72 is rotated, the shaft 32 can be rotated by an urging force applied from the receiving hole flat surface portions 751 against the end section flat surface portions 411, respectively, in addition to a frictional force generated at a contact part between each of the end section curved surface portions 412 and the corresponding one of the receiving hole curved surface portions 752.

Thus, in the valve device 10, the shaft 32 can be more easily rotated in response to the rotation of the gear arrangement 72 in comparison to a case where the shaft 32 is rotated only by the frictional force, and thereby it is possible to limit the deviation of the rotational angle of the shaft 32 relative to the rotational angle of the gear arrangement 72.

Furthermore, since the shaft end section 40 has the end section curved surface portions 412, it is possible to ensure a sufficient size of a contact area between the end section outer periphery 41 and the receiving hole inner periphery 75 in comparison to a case where each of the end section outer periphery 41 and the receiving hole inner periphery 75 has only the flat surface portion(s).

Therefore, the valve device 10 can easily ensure the force for holding the shaft 32 when the shaft end section 40 is press-fitted into the shaft receiver 74. Thus, since the gear arrangement 72 and the shaft 32 can be easily rotated together in the valve device 10, it is possible to limit the deviation of the rotational angle of the shaft 32 relative to the rotational angle of the gear arrangement 72.

Furthermore, since each of the receiving hole flat surface portions 751 and the end section flat surface portion 411 is shaped in the flat surface form, the urging force applied from each of the receiving hole flat surface portions 751 against the corresponding one of the end section flat surface portions 411 can be substantially uniformly applied at the time of rotating the shaft 32. Therefore, it is possible to more effectively limit deformation of the receiving hole flat surface portions 751 in the valve device 10 in comparison to a case where each of the receiving hole flat surface portions 751 and the end section flat surface portions 411 is not shaped in the flat surface form like in a case where each of the receiving hole flat surface portions 751 and the end section flat surface portions 411 is formed with a series of ridges and troughs. Therefore, the valve device 10 can limit the deviation of the rotational angle of the shaft 32 relative to the rotational angle of the gear arrangement 72 caused by the deformation of the receiving hole flat surface portions 751.

By the way, in the case where the shaft end section 40 is made of the metal member as in the present embodiment, in order to form the curved surface portion on the end section outer periphery 41, a method of rotating the shaft end section 40 about the end section central axis Axs and lathing the end section outer periphery 41 with a machine tool is common. Furthermore, in order to form the flat surface portion on the end section outer periphery 41, a method of holding the shaft end section 40 and milling the end section outer periphery 41 with a machine tool is common. Further, in the lathing, it is easier to improve the accuracy of the machining distance, which is the distance from the end section central axis Axs to the machining portion, as compared with the milling.

Therefore, in the valve device 10, for example, by forming the shaft end section 40 about the end section central axis Axs by the lathing, the end section curved surface portion 412 can be machined with higher accuracy than the end section flat surface portion 411. That is, in the valve device 10, at the time of press-fitting the shaft end section 40 into the receiving hole 741, a fitting tolerance between the end section curved surface portion 412 and the receiving hole curved surface portion 752 can be more easily adjusted in comparison to a fitting tolerance between the end section flat surface portion 411 and the receiving hole flat surface portion 751.

Thus, in the valve device 10, at the time of press-fitting the shaft end section 40 into the receiving hole 741, the end section central axis Axs and the receiving hole central axis Axh can be easily overlapped with each other, and a tightening margin at the time of press-fitting the end section curved surface portion 412 against the receiving hole curved surface portion 752 can be easily ensured. In other words, in the valve device 10, the shaft receiver 74 can sufficiently hold the shaft end section 40 even when the tightening margin at the time of press-fitting the end section flat surface portion 411 against the receiving hole flat surface portion 751 cannot be sufficiently ensured.

Further, in the valve device 10, since the shaft end section 40 is press-fitted into and is secured to the receiving hole 741, a space for forming a male thread for fastening the nut to the shaft 32 becomes unnecessary, and the nut for the fastening becomes unnecessary. Therefore, in the valve device 10 of the present embodiment, the size of the shaft 32 in the axial direction of the rotational axis Axr of the shaft 32 can be reduced in comparison to the case where the gear arrangement 72 (more specifically, the third gear 723) is fixed to the shaft 32 by the nut, and the number of the components of the valve 30 can be reduced.

Furthermore, in the valve device 10, when the shaft 32 is rotated, the pair of receiving hole flat surface portions 751, which are opposed to each other, can respectively contact and urge the pair of end section flat surface portions 411 in the direction perpendicular to the axial direction of the receiving hole axis Axh such that a direction of a force, which is applied from one of the pair of receiving hole flat surface portions 751 to the corresponding one of the pair of end section flat surface portions 411, and a direction of a force, which is applied from the other one of the pair of receiving hole flat surface portions 751 to the other one of the pair of end section flat surface portions 411, are opposite to each other. Therefore, in the valve device 10, the shaft 32 can be rotated by a couple (i.e., a pair of forces, equal in magnitude, oppositely directed) about the receiving hole central axis Axh, so that the shaft 32 can be more easily rotated in comparison to a case where the end section outer periphery 41 is formed without including the pair of end section flat surface portions 411.

Furthermore, when the shaft end section 40 is press-fitted into the receiving hole 741, a stress in the press-fitting direction is generated at a portion of the shaft receiver 74 where the receiving hole inner periphery 75 and the end section outer periphery 41 contact with each other. Furthermore, in the present embodiment, since each of the end section connecting portions 413 of the shaft end section 40 is sharp, the stress tends to concentrate on a portion of the receiving hole inner periphery 75, to which the end section connecting portion 413 contacts, when the end section connecting portion 413 contacts the receiving hole inner periphery 75 at the time of press-fitting the shaft end section 40 into the receiving hole 741.

On the other hand, the receiving hole inner periphery 75 has the recesses 753. Each of the recesses 753 is formed between the corresponding adjacent receiving hole flat surface portion 751 and the corresponding adjacent receiving hole curved surface portion 752 and is spaced from the corresponding adjacent end section flat surface portion 411 and the corresponding adjacent end section curved surface portion 412. Therefore, in the valve device 10, when the shaft end section 40 is press-fitted into the receiving hole 741, the end section connecting portions 413 are less likely to come into contact with the receiving hole inner periphery 75. Thus, in the valve device 10, when the shaft end section 40 is press-fitted into the receiving hole 741, it is possible to limit the concentration of the stress at each portion of the receiving hole 741, to which the corresponding end section connecting portion 413 contacts. As a result, it is possible to limit the shaft receiver 74 from being damaged at the time of press-fitting the shaft end section 40 into the receiving hole 741.

Furthermore, when the shaft end section 40 is press-fitted into the receiving hole 741, a force for expanding the inner diameter of the receiving hole 741 is likely to be concentrated at a thin wall part of the shaft receiver 74.

On the other hand, each of the parts of the shaft receiver 74, which are respectively opposed to the end section non-contact portions 414, has the constant wall thickness. Therefore, when the shaft end section 40 is press-fitted into the receiving hole 741, it is possible to limit the concentration of the force that expands the inner diameter of the receiving hole 741. Therefore, when the shaft end section 40 is press-fitted into the receiving hole 741, it is possible to limit the damage of the shaft receiver 74 in the valve device 10.

Furthermore, in the valve device 10, the maximum outer diameter of the shaft end section 40 is smaller than the inner diameter of the shaft seal member 66. Therefore, even in the case where the shaft end section 40 is press-fitted into the receiving hole 741 through the shaft seal member 66 in the state where the shaft seal member 66 is installed at the valve device 10, the shaft end section 40 is less likely to contact the inner periphery of the shaft seal member 66. Thus, in the valve device 10, it is possible to limit the damage of the shaft seal member 66 caused by the contact of the shaft end section 40 to the inner periphery of the shaft seal member 66.

Furthermore, the shaft end section 40 is formed such that the shape of the radial cross-section of the shaft end section 40 is point-symmetrical about the end section central axis Axs. Therefore, in the valve device 10, at the time of press-fitting the shaft 32 into the receiving hole 741 at the predetermined rotation angle, the shaft 32 can be inserted into the receiving hole 741 even in the state where the shaft 32 is rotated in the circumferential direction of the rotational axis Axr relative to the predetermined rotational angle by 180 degrees. That is, in the valve device 10, the shaft end section 40 can be more easily press-fitted into the receiving hole 741 in comparison to the case where the radial cross-section of the shaft end section 40 is not point-symmetrical about the end section central axis Axs.

Second Embodiment

Next, a second embodiment will be described with reference to FIG. 6. The present embodiment differs from the first embodiment with respect to that the end section connecting portions 413 are chamfered. In the present embodiment, differences, which are different from the first embodiment, will be mainly described, and the portions, which are the same or similar to those of the first embodiment, will not be described redundantly.

Figure 6:
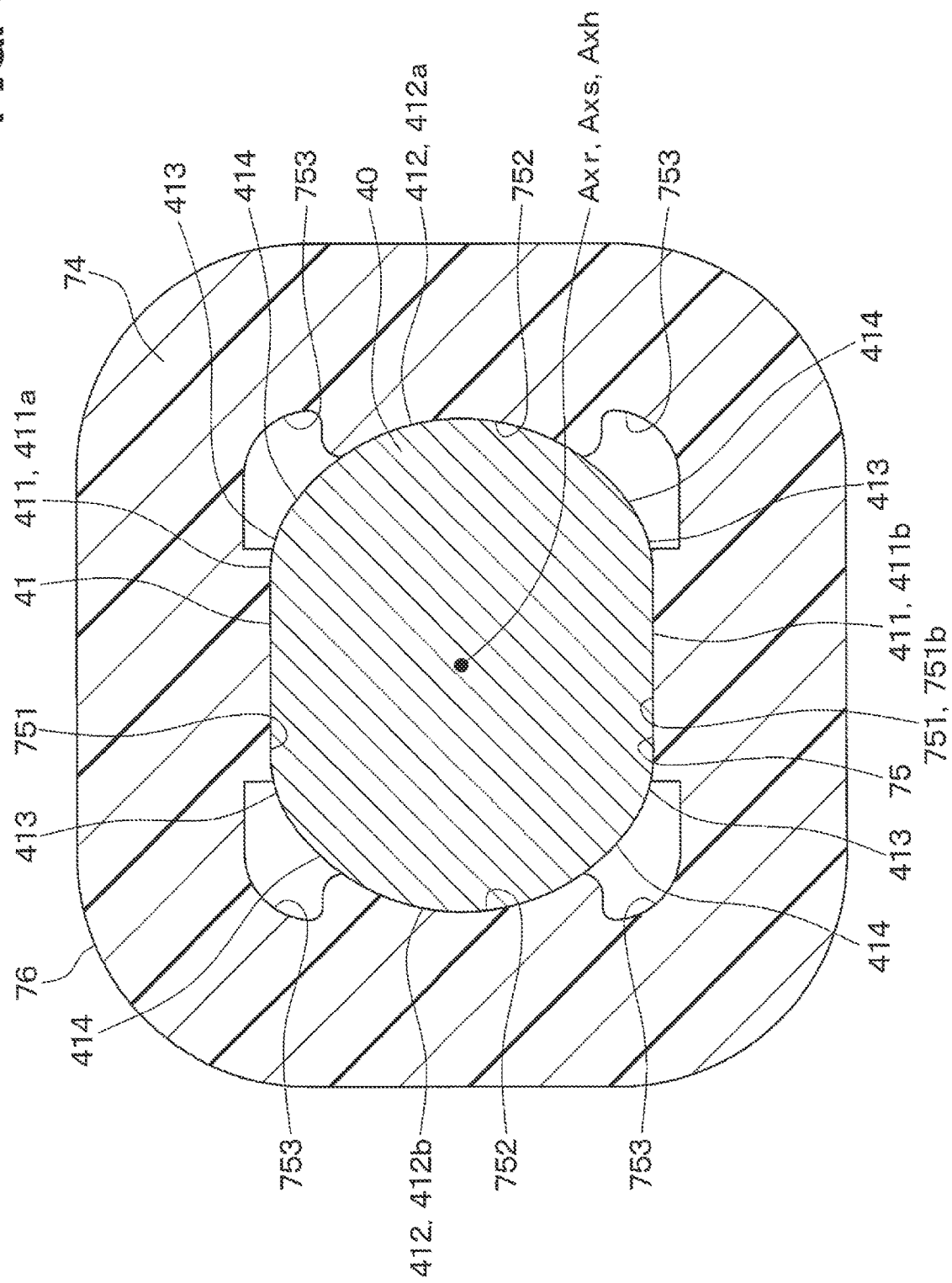
FIG. 6 is a diagram for describing a shaft end section of a second embodiment.

As shown in FIG. 6, the end section connecting portions 413 of the present embodiment are chamfered and are respectively shaped in a curved form in the radial cross-section of the shaft end section 40. Specifically, in the present embodiment, a radial size of each of the portions of the end section outer periphery 41, at which the end section connecting portions 413 are respectively formed, is reduced toward the radially inner side of the shaft end section 40 in comparison to the end section outer periphery 41 of the first embodiment. Here, the chamfering means removing a sharp portion at the connecting portion between the end section flat surface portion 411 and the end section curved surface portion 412 described in the first embodiment by, for example, cutting.

The shape of each of the end section connecting portions 413, which are chamfered, should not be limited to the curved form in the radial cross-section of the shaft end section 40 and may be, for example, a straight form.

In the valve device 10 of the present embodiment described above, when the shaft end section 40 is press-fitted into the receiving hole 741, the end section connecting portions 413 are less likely to come into contact with the shaft receiver 74. Thus, in the valve device 10, when the shaft end section 40 is press-fitted into the receiving hole 741, it is possible to limit the concentration of the stress at each portion of the receiving hole 741, to which the corresponding end section connecting portion 413 contacts. As a result, it is possible to limit the shaft receiver 74 from being damaged at the time of press-fitting the shaft end section 40 into the receiving hole 741.

OTHER EMBODIMENTS

Although the representative embodiments of the present disclosure have been described above, the present disclosure is not limited to the above-described embodiments and can be variously modified as follows, for example.

In the above embodiments, there is described the case where the end section outer periphery 41 includes the pair of end section flat surface portions 411a, 411b and the pair of end section curved surface portions 412a, 412b. However, the present disclosure should not be limited to this configuration. Furthermore, the receiving hole inner periphery 75 has: the pair of receiving hole flat surface portions 751a, 751b, which are opposed to each other about the receiving hole central axis Axh; and the pair of receiving hole curved surface portions 752a, 752b, which are opposed to each other about the receiving hole central axis Axh. However, the present disclosure should not be limited to this configuration.

For example, the end section outer periphery 41 may have a shape that includes each of the end section flat surface portion 411 and the end section curved surface portion 412. Furthermore, the receiving hole inner periphery 75 may have a shape that includes each of the receiving hole flat surface portion 751 and the receiving hole curved surface portion 752.

Figure 7:
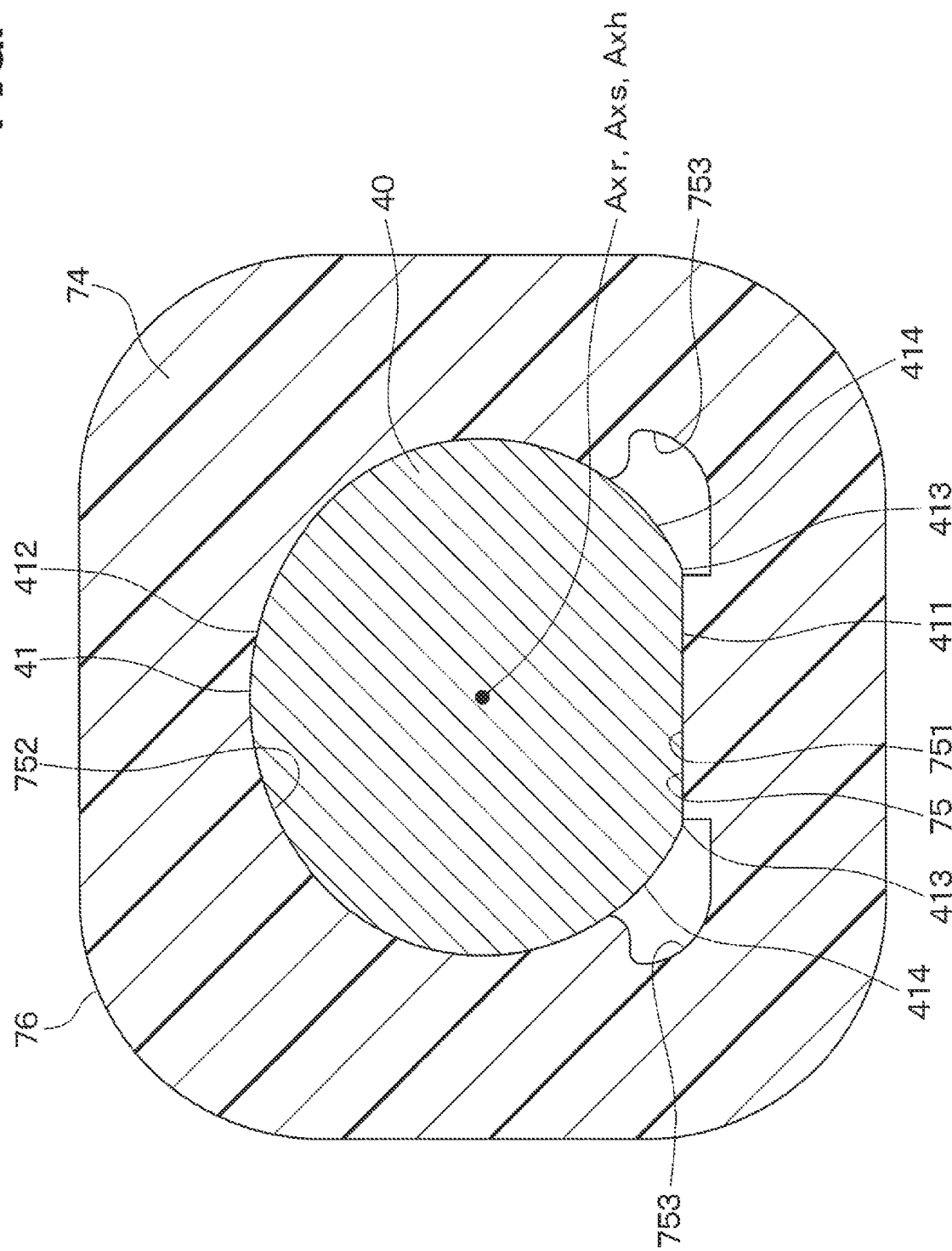
FIG. 7 is a diagram for describing a shaft receiver and a shaft end section of another embodiment.

Specifically, as shown in FIG. 7, the end section outer periphery 41 may have the single end section flat surface portion 411 and the single end section curved surface portion 412. Furthermore, as shown in FIG. 7, the receiving hole inner periphery 75 may have the single receiving hole flat surface portion 751 and the single receiving hole curved surface portion 752. In this case, in the end section outer periphery 41, the end section connecting portion 413 is formed at each of two connections, at each of which the end section flat surface portion 411 and the end section curved surface portion 412 are connected with each other. Furthermore, in the receiving hole inner periphery 75, the recess 753 is formed at each of two locations of the receiving hole inner periphery 75, which are opposed to the two end section connecting portions 413, respectively.

Furthermore, in the above embodiments, there is described the example where the receiving hole flat surface portions 751 and the receiving hole curved surface portions 752 are alternately arranged in the circumferential direction such that the corresponding one of the receiving hole flat surface portions 751 and the corresponding one of the receiving hole curved surface portion 752 are connected with each other through the portion of the receiving hole inner periphery 75 which is spaced from the corresponding adjacent one of the end section flat surface portions 411 and the corresponding adjacent one of the end section curved surface portions 412. For example, the receiving hole flat surface portions 751 and the receiving hole curved surface portions 752 may be alternately arranged in the circumferential direction such that the corresponding one of the receiving hole flat surface portions 751 and the corresponding one of the receiving hole curved surface portion 752 are connected with each other without through the portion of the receiving hole inner periphery 75 which is spaced from the corresponding adjacent one of the end section flat surface portions 411 and the corresponding adjacent one of the end section curved surface portions 412.

Figure 8:
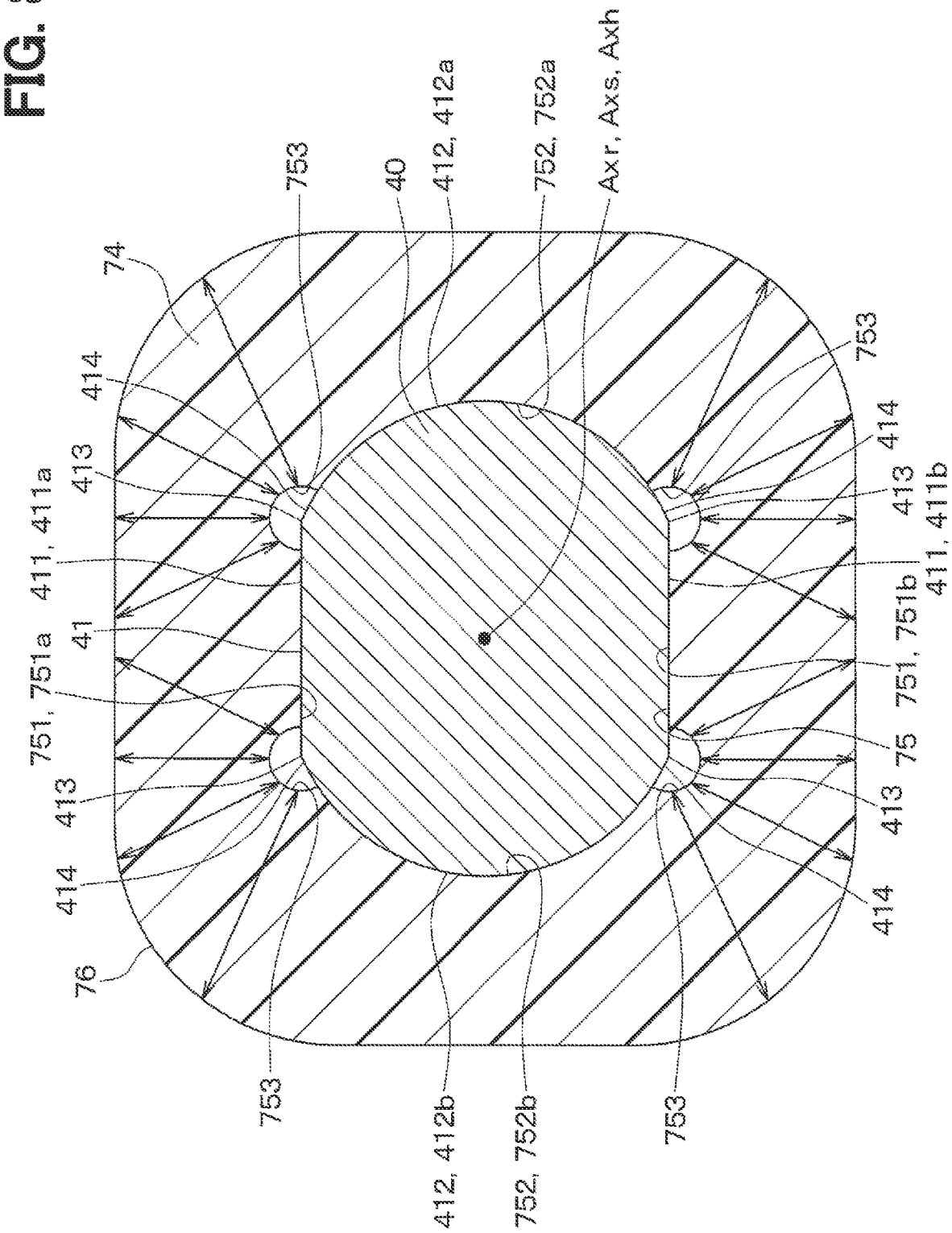
FIG. 8 is a diagram for describing a shaft receiver of another embodiment.

Furthermore, in the above embodiments, there is described the example where each of the parts of the shaft receiver 74, which are respectively opposed to the end section non-contact portions 414, has the constant wall thickness. However, the present disclosure should not be limited to this configuration. For example, as shown in FIG. 8, each of the parts of the shaft receiver 74, which are respectively opposed to the end section non-contact portions 414, may not have the constant wall thickness.

Furthermore, in the above embodiments, there is described the example where the maximum outer diameter of the shaft end section 40 is smaller than the inner diameter of the shaft seal member 66. For example, the maximum outer diameter of the shaft end section 40 may be equal to the inner diameter of the shaft seal member 66, or the shaft end section 40 may be larger than the shaft seal member 66.

Furthermore, in the above embodiments, there is described the example where the valve device 10 controls the flow rate of the coolant which flows in the cooling system 1. For example, the valve device 10 may be applied to various other types of apparatuses that is other than the cooling system 1. Furthermore, the valve device 10 may be applied to control a flow rate of a fluid that is other than the coolant.

Needless to say, in the above-described embodiments, the elements of each embodiment are not necessarily essential except when it is clearly indicated that they are essential and when they are clearly considered to be essential in principle.

In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle.

In each of the above embodiments, when the shape, positional relationship or the like of the constituent elements of the embodiment is mentioned, the present disclosure should not be limited such a shape or positional relationship unless it is clearly stated that it is essential and/or it is required in principle.

CONCLUSION

According to a first aspect described in some or all of the above embodiments, a valve device includes: a valve element that is configured to control a flow rate of a fluid; a shaft that is made of metal and is coupled to the valve element; and a gear arrangement that includes a shaft receiver which is made of resin and forms a receiving hole while a shaft end section of the shaft is inserted into the receiving hole. In the valve device, an end section outer periphery of the shaft includes an end section flat surface portion and an end section curved surface portion, and a receiving hole inner periphery of the receiving hole includes a receiving hole flat surface portion and a receiving hole curved surface portion. The shaft end section is press-fitted into the receiving hole such that the receiving hole flat surface portion contacts at least a part of the end section flat surface portion, and the receiving hole curved surface portion contacts at least a part of the end section curved surface portion, while a central axis of the shaft end section overlaps with a central axis of the receiving hole.

According to a second aspect, the receiving hole inner periphery is formed such that the receiving hole flat surface portion is one of a pair of receiving hole flat surface portions, which are opposed to each other about the central axis of the receiving hole, and the receiving hole curved surface portion is one of a pair of receiving hole curved surface portions, which are opposed to each other about the central axis of the receiving hole. The end section outer periphery is formed such that the end section flat surface portion is one of a pair of end section flat surface portions, which are opposed to the pair of receiving hole flat surface portions, respectively, and the end section curved surface portion is one of a pair of end section curved surface portions, which are opposed to the pair of receiving hole curved surface portions, respectively.

According to the above configuration, in the valve device, when the shaft is rotated, the pair of receiving hole flat surface portions, which are opposed to each other, can respectively contact and urge the pair of end section flat surface portions in the direction perpendicular to the axial direction of the receiving hole axis such that a direction of a force, which is applied from one of the pair of receiving hole flat surface portions to a corresponding one of the pair of end section flat surface portions, and a direction of a force, which is applied from the other one of the pair of receiving hole flat surface portions to the other one of the pair of end section flat surface portions, are opposite to each other. Therefore, in the valve device, the shaft can be rotated by a couple (i.e., a pair of forces, equal in magnitude, oppositely directed) about the receiving hole central axis, so that the shaft can be more easily rotated in comparison to a case where the end section outer periphery is formed without including the pair of end section flat surface portions.

According to a third aspect, the end section outer periphery has an end section connecting portion at a connection between a corresponding one of the pair of end section flat surface portions and a corresponding one of the pair of end section curved surface portions. A corresponding one of the pair of receiving hole flat surface portions and a corresponding one of the pair of receiving hole curved surface portions are connected with each other through a portion of the receiving hole inner periphery which is spaced from the corresponding one of the pair of end section flat surface portions and the corresponding one of the pair of end section curved surface portions.

According to the above configuration, in the valve device, when the shaft end section is press-fitted into the receiving hole, the end section connecting portion is less likely to come into contact with the receiving hole inner periphery. Thus, when the shaft end section is press-fitted into the receiving hole, it is possible to limit concentration of the stress at each part of the shaft receiver, to which the corresponding end section connecting portion contacts. As a result, it is possible to limit the shaft receiver from being damaged at the time of press-fitting the shaft end section into the receiving hole.

According to a fourth aspect, the shaft receiver is shaped in a tubular form. A portion of the end section outer periphery, which does not contact the receiving hole inner periphery, is defined as an end section non-contact portion. A wall thickness of a part of the shaft receiver, which is opposed to the end section non-contact portion, is constant.

According to the above configuration, the part of the shaft receiver, which is opposed to the end section non-contact portion, has the constant wall thickness. Therefore, when the shaft end section is press-fitted into the receiving hole, it is possible to limit the concentration of the force that expands the inner diameter of the receiving hole. Thus, when the shaft end section is press-fitted into the receiving hole, it is possible to limit the damage of the shaft receiver in the valve device.

According to a fifth aspect, the end section connecting portion is chamfered.

According to the above configuration, when the shaft end section is press-fitted into the receiving hole, the end section connecting portion is less likely to come into contact with the receiving hole inner periphery. Thus, when the shaft end section is press-fitted into the receiving hole, it is possible to limit concentration of the stress at the part of the shaft receiver, to which the end section connecting portion contacts. As a result, it is possible to limit the shaft receiver from being damaged at the time of press-fitting the shaft end section into the receiving hole.

According to a sixth aspect, the valve device includes a shaft seal member that is shaped in a ring form and is installed to an outer periphery of the shaft. The shaft end section is formed such that a maximum length of a straight line, which connects between two different points of an outer periphery of the radial cross-section of the shaft end section, is smaller than an inner diameter of the shaft seal member.

According to this configuration, even in the case where the shaft end section is press-fitted into the receiving hole through the shaft seal member in the state where the shaft seal member is installed at the valve device, the shaft end section is less likely to contact the inner periphery of the shaft seal member. Thus, in the valve device, it is possible to limit the damage of the shaft seal member caused by the contact of the shaft end section to the inner periphery of the shaft seal member.

What is claimed is:

1. A valve device comprising:
    a flow passage that is configured to conduct a fluid;
    a valve element that is configured to control a flow rate of the fluid that is outputted from the flow passage;
    a shaft that is made of metal and is coupled to the valve element;
    an electric motor that is configured to output a drive force for rotating the valve element through the shaft; and
    a gear unit that is configured to transmit an output of the electric motor to the shaft, wherein:
    the gear unit includes a shaft receiver that is made of resin and forms a receiving hole, wherein a shaft end section of the shaft, which is located at one axial side of the shaft, is inserted into the receiving hole;
    an end section outer periphery, which forms an outer periphery of the shaft end section, has:
        an end section flat surface portion, which extends linearly in a radial cross-section of the shaft end section; and
        an end section curved surface portion, which forms an arc centered at a central axis of the shaft end section in the radial cross-section of the shaft end section;
    a receiving hole inner periphery, which forms an inner periphery of the receiving hole, has:
        a receiving hole flat surface portion, which extends linearly in a radial cross-section of the receiving hole; and
        a receiving hole curved surface portion, which forms an arc centered at a central axis of the receiving hole in the radial cross-section of the receiving hole;
    the shaft end section is press-fitted into the receiving hole such that the receiving hole flat surface portion contacts at least a part of the end section flat surface portion, and the receiving hole curved surface portion contacts at least a part of the end section curved surface portion, while the central axis of the shaft end section overlaps with the central axis of the receiving hole;
    the receiving hole inner periphery is formed such that the receiving hole flat surface portion is one of a pair of receiving hole flat surface portions, which are opposed to each other about the central axis of the receiving hole, and the receiving hole curved surface portion is one of a pair of receiving hole curved surface portions, which are opposed to each other about the central axis of the receiving hole;
    the end section outer periphery is formed such that the end section flat surface portion is one of a pair of end section flat surface portions, which are opposed to the pair of receiving hole flat surface portions, respectively, and the end section curved surface portion is one of a pair of end section curved surface portions, which are opposed to the pair of receiving hole curved surface portions, respectively;
    the end section outer periphery has an end section connecting portion at a connection between a corresponding one of the pair of end section flat surface portions and a corresponding one of the pair of end section curved surface portions; and
    a corresponding one of the pair of receiving hole flat surface portions and a corresponding one of the pair of receiving hole curved surface portions are connected with each other through a portion of the receiving hole inner periphery which is spaced from the corresponding one of the pair of end section flat surface portions and the corresponding one of the pair of end section curved surface portions.

2. The valve device according to claim 1, wherein:
    the shaft receiver is shaped in a tubular form;
    a portion of the end section outer periphery, which does not contact the receiving hole inner periphery, is defined as an end section non-contact portion; and
    a wall thickness of a part of the shaft receiver, which is opposed to the end section non-contact portion, is constant.

3. The valve device according to claim 1, wherein the end section connecting portion is chamfered.

4. The valve device according to claim 1, comprising a shaft seal member that is shaped in a ring form and is installed to an outer periphery of the shaft, wherein:
    the shaft end section is formed such that a maximum length of a straight line, which connects between two different points of an outer periphery of the radial cross-section of the shaft end section, is smaller than an inner diameter of the shaft seal member.

* * * * *